(12) United States Patent
Herman

(10) Patent No.: US 12,385,297 B2
(45) Date of Patent: Aug. 12, 2025

(54) SYSTEM AND METHOD FOR AN APPLIQUE WITH DEPLOYABLE HANDLE

(71) Applicant: Magna Mirrors of America, Inc., Holland, MI (US)

(72) Inventor: Ryan Herman, Aurora (CA)

(73) Assignee: Magna Mirrors of America, Inc., Holland, MI (US)

( * ) Notice: Subject to any disclaimer, the term of this patent is extended or adjusted under 35 U.S.C. 154(b) by 147 days.

(21) Appl. No.: 18/169,917

(22) Filed: Feb. 16, 2023

(65) Prior Publication Data
US 2023/0258030 A1    Aug. 17, 2023

Related U.S. Application Data

(60) Provisional application No. 63/310,716, filed on Feb. 16, 2022.

(51) Int. Cl.
| | |
|---|---|
| *E05B 85/10* | (2014.01) |
| *B60J 5/04* | (2006.01) |
| *B60R 13/04* | (2006.01) |
| *B60R 25/23* | (2013.01) |
| *E05B 85/14* | (2014.01) |

(52) U.S. Cl.
CPC ............... *E05B 85/107* (2013.01); *B60J 5/04* (2013.01); *B60R 13/04* (2013.01); *B60R 25/23* (2013.01); *E05B 85/14* (2013.01)

(58) Field of Classification Search
CPC ........ E05B 85/107; E05B 85/14; E05B 79/06; B60J 5/04; B60R 13/04; B60R 25/23
USPC ..................................................... 292/336.3
See application file for complete search history.

(56) References Cited

U.S. PATENT DOCUMENTS

| | | |
|---|---|---|
| 5,371,659 A | 12/1994 | Pastrick et al. |
| 5,497,305 A | 3/1996 | Pastrick et al. |
| 5,669,699 A | 9/1997 | Pastrick et al. |
| 5,671,996 A | 9/1997 | Bos et al. |
| 5,823,654 A | 10/1998 | Pastrick et al. |
| 5,938,321 A | 8/1999 | Bos et al. |
| 6,086,229 A | 7/2000 | Pastrick |
| 6,139,172 A | 10/2000 | Bos et al. |

(Continued)

FOREIGN PATENT DOCUMENTS

| | | | | |
|---|---|---|---|---|
| DE | 102006048371 A1 | * | 4/2008 | ............... E05B 7/00 |
| DE | 102019218290 A1 | * | 6/2020 | ......... E05B 47/0001 |

*Primary Examiner* — Kristina R Fulton
*Assistant Examiner* — James Edward Ignaczewski
(74) *Attorney, Agent, or Firm* — HONIGMAN LLP

(57) ABSTRACT

A vehicular exterior door handle assembly includes a base portion configured to mount at a vehicle door. A handle portion includes a grasping portion and is movable relative to the base portion between a recessed position, where the grasping portion is recessed at the base portion, and a deployed position, where the grasping portion protrudes outward to be graspable by the user. A deployment mechanism is operable to move the handle portion between the recessed and deployed positions. A control module, based on a user input, actuates a latch mechanism to unlock the vehicle door. The deployment mechanism, responsive to the control module unlocking the vehicle door, moves the handle portion from the recessed position to the deployed position. With the handle portion in the deployed position and the vehicle door unlocked, the handle portion is graspable by the user to open the vehicle door.

25 Claims, 10 Drawing Sheets

(56) References Cited

U.S. PATENT DOCUMENTS

| | | |
|---|---|---|
| 6,149,287 A | 11/2000 | Pastrick et al. |
| 6,152,590 A | 11/2000 | Furst et al. |
| 6,176,602 B1 | 1/2001 | Pastrick et al. |
| 6,276,821 B1 | 8/2001 | Pastrick et al. |
| 6,280,069 B1 | 8/2001 | Pastrick et al. |
| 6,291,905 B1 | 9/2001 | Drummond et al. |
| 6,349,450 B1 | 2/2002 | Koops et al. |
| 6,396,408 B2 | 5/2002 | Drummond et al. |
| 6,416,208 B2 | 7/2002 | Pastrick et al. |
| 6,477,464 B2 | 11/2002 | McCarthy et al. |
| 6,550,103 B2 | 4/2003 | Koops et al. |
| 6,568,839 B1 | 5/2003 | Pastrick et al. |
| 6,907,643 B2 | 6/2005 | Koops et al. |
| 6,977,619 B2 | 12/2005 | March et al. |
| 7,407,203 B2 | 8/2008 | Huizenga et al. |
| 8,333,492 B2 | 12/2012 | Dingman et al. |
| 8,786,401 B2 | 7/2014 | Sobecki et al. |
| 8,801,245 B2 | 8/2014 | De Wind et al. |
| 9,322,191 B2 * | 4/2016 | Müller ................ E05B 85/107 |
| 10,280,658 B2 * | 5/2019 | Halliwell ............ E05B 85/107 |
| 11,441,338 B2 | 9/2022 | Blank et al. |
| 11,725,432 B2 * | 8/2023 | Guerin ................ E05B 81/42 |
| | | 70/208 |
| 11,879,276 B2 * | 1/2024 | Toyama ............... B60J 5/0468 |
| 2010/0007463 A1 | 1/2010 | Dingman et al. |
| 2010/0088855 A1 | 4/2010 | Ruse et al. |
| 2011/0148575 A1 * | 6/2011 | Sobecki ................ E05B 5/006 |
| | | 292/336.3 |
| 2017/0130493 A1 * | 5/2017 | Guerin ................ E05B 81/76 |
| 2018/0106082 A1 * | 4/2018 | Brown ................ E05B 85/107 |
| 2020/0102773 A1 * | 4/2020 | Sobecki .............. E05B 85/107 |
| 2021/0332619 A1 | 10/2021 | Peterson et al. |
| 2021/0370877 A1 | 12/2021 | Peterson |
| 2022/0018168 A1 | 1/2022 | Cervone et al. |
| 2022/0282534 A1 | 9/2022 | Peterson et al. |
| 2022/0341226 A1 | 10/2022 | Sobecki et al. |
| 2023/0001849 A1 | 1/2023 | Dingman et al. |
| 2023/0258030 A1 * | 8/2023 | Herman ................ B60R 25/23 |
| | | 292/336.3 |
| 2024/0035318 A1 | 2/2024 | Sobecki et al. |
| 2024/0076915 A1 | 3/2024 | LaCross et al. |
| 2024/0240499 A1 | 7/2024 | Morey et al. |

\* cited by examiner

SYSTEM AND METHOD FOR AN APPLIQUE WITH DEPLOYABLE HANDLE

CROSS REFERENCE TO RELATED APPLICATION

The present application claims the filing benefits of U.S. provisional application Ser. No. 63/310,716, filed Feb. 16, 2022, which is hereby incorporated herein by reference in its entirety.

FIELD OF THE INVENTION

The present invention relates to handles for vehicles and, more particularly, to an exterior handle for opening a side door and/or liftgate of a vehicle.

BACKGROUND OF THE INVENTION

A door handle for a vehicle door typically includes a handle portion that is pivotable relative to a base portion, whereby pivotal movement of the handle portion actuates a latch mechanism to open the door. Typically, a door handle is a pull strap handle with a strap handle portion that protrudes outwardly from the side of the vehicle for grasping by the person opening the door of the vehicle. Alternately, paddle type door handle assemblies are known, where a paddle portion is pivotally mounted to a base portion and is pulled generally outwardly and upwardly to open the vehicle door.

A primary concern for outside handles for closure panels for vehicles is that one must be able to open the door in freezing conditions while also providing some object (e.g., handle) for the user to grab and thus manually manipulate the position of the door between open and closed positions. Handle-less designs are known, however molded features in a frame of the closure panel can be expensive to manufacture and can detract from a desired streamlined look of the vehicle. Further, aerodynamic concerns, as well as sealing concerns (providing for a mode of failure for infiltration of foreign debris and moisture into the interior of a door panel), are disadvantages of today's handle designs in which the handle is mounted in an aperture in the door panel skin.

SUMMARY OF THE INVENTION

A vehicular exterior door handle assembly includes a base portion configured to mount at a door of a vehicle equipped with the vehicular exterior door handle assembly. The base portion is mounted along an outer surface of the door or an outer surface or portion of a support structure or frame of the door. A handle portion includes a grasping portion and is movable relative to the base portion between a recessed position, where the grasping portion of the handle portion is at least partially recessed at the base portion, and a deployed position, where the grasping portion of the handle portion protrudes outward from the base portion so as to be graspable by the user. A deployment mechanism is coupled to the handle portion and operable to move the handle portion between the recessed position and the deployed position. A control module includes electronic circuitry and is disposed remote from the vehicular exterior door handle assembly and is configured to control a latch mechanism of the door. The control module, based on a user input, actuates the latch mechanism of the door to unlock the door. The deployment mechanism, responsive to the control module actuating the latch mechanism to unlock the door, is electrically operated to move the handle portion from the recessed position to the deployed position. With the handle portion in the deployed position and the door unlocked, the handle portion is graspable by the user to open the door.

These and other objects, advantages, purposes and features of the present invention will become apparent upon review of the following specification in conjunction with the drawings.

DESCRIPTION OF THE PREFERRED EMBODIMENTS

Figure 1A:
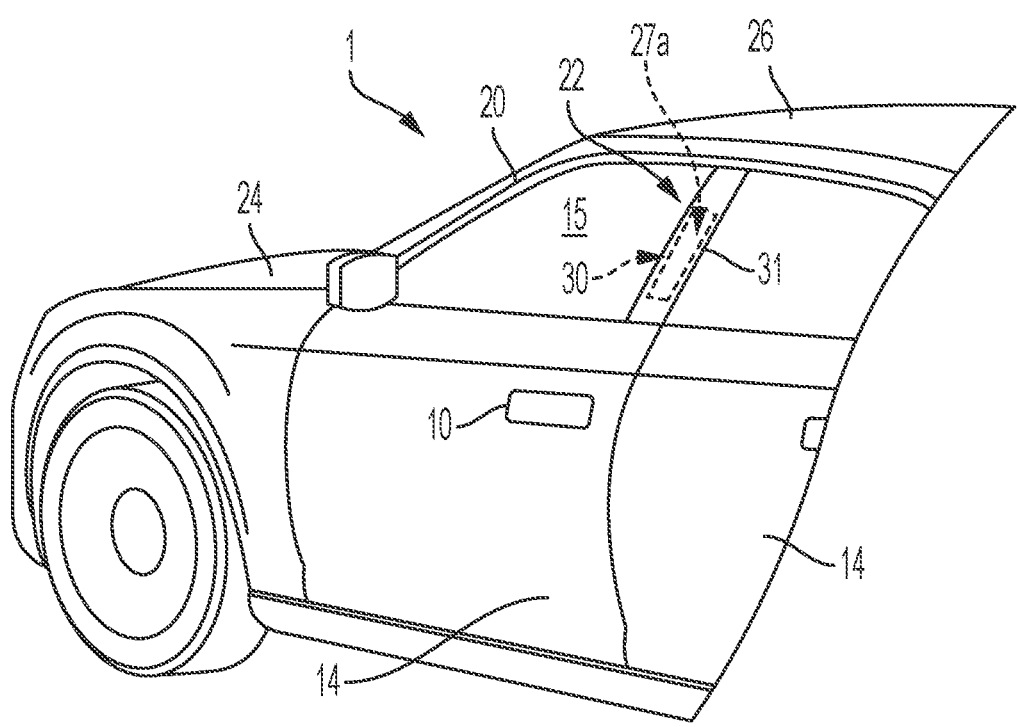
FIGS. 1A and 1B are perspective views of a vehicle equipped with a deployable handle assembly.
Figure 1B:
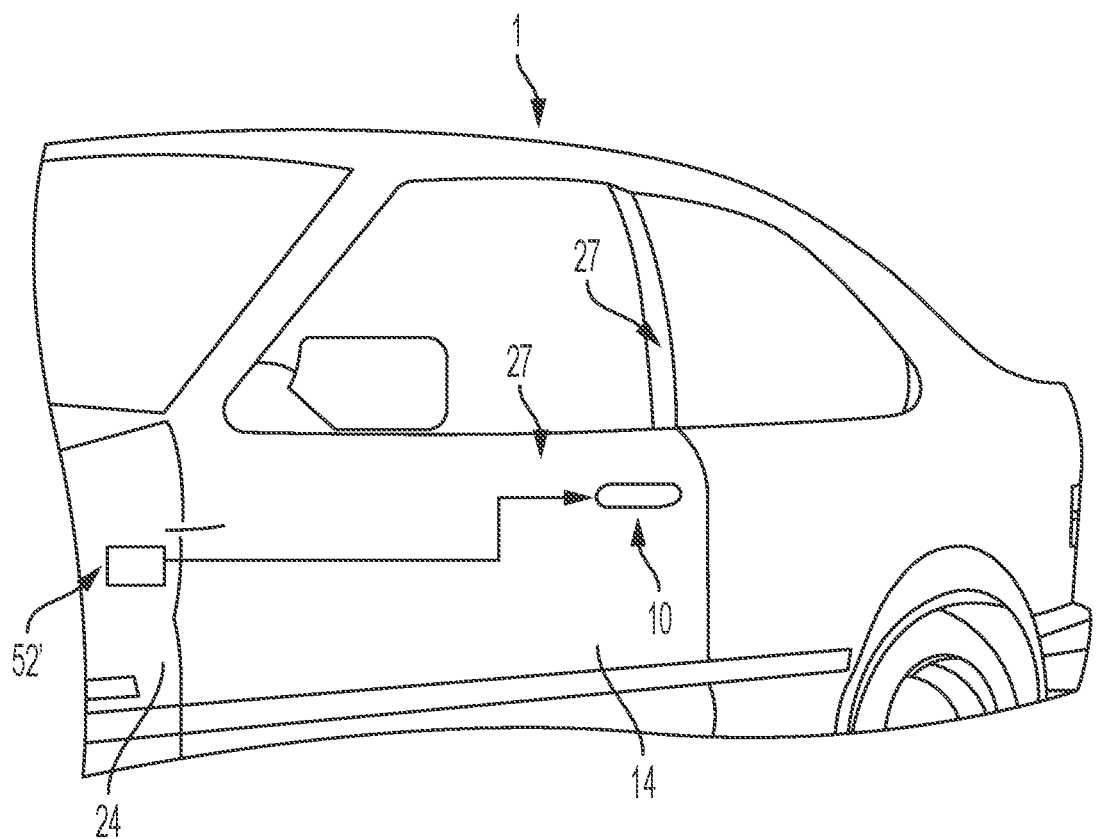
Figure 1C:
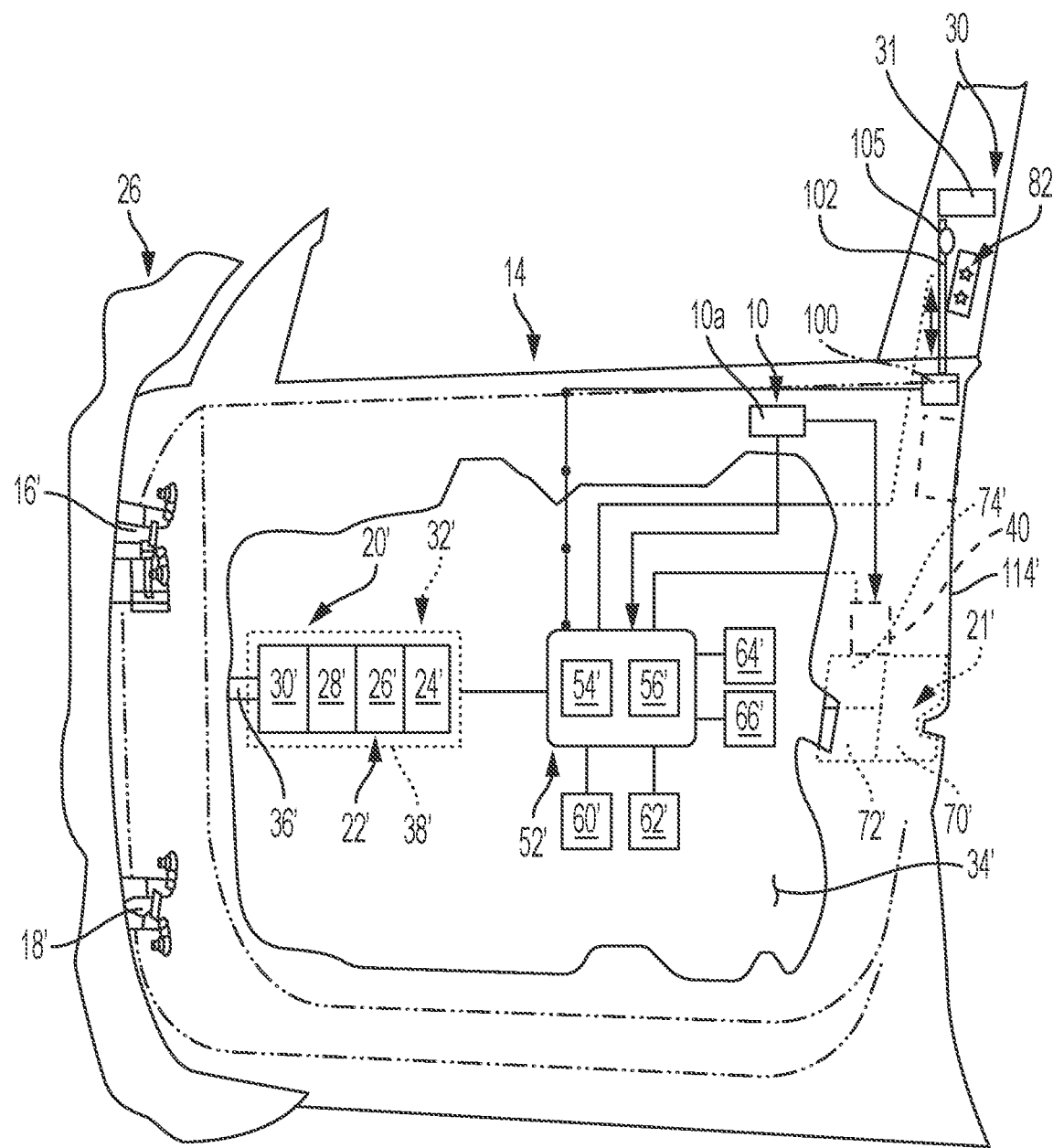
FIG. 1C is a block diagram of the vehicle door showing the handle assembly, a control system, a latch assembly, and power door actuation system.

Referring to FIGS. 1A and 1C, a side view of a vehicle 1 is shown partially cut away to include closure panels 14, such as a front driver-side door 14 and a rear driver-side door 14, which may provide access to an interior portion or passenger compartment 15 of the vehicle 1. The front driver-side door 14 includes a user interface assembly 10 for locking and unlocking of a mechanically-activated latch mechanism 21' (e.g., FIG. 1C) mounted within the door 14. The door 14 may be configured as having an outer sheet metal panel connected to an inner sheet metal panel to define a cavity or compartment or interior portion 34' therebetween. The compartment 34' of the door 14 may accommodate or house one or more door components or systems, such as a window regulator, a door module, a power side door actuator, a door latch, and the like. The outer sheet metal panel of the door 14 may be painted to provide a Class-A surface (i.e., a physical surface of the vehicle that is intended to be directly viewed and/or touched by users of the vehicle), and the door 14 may not include an aperture or opening or interruption in the outer sheet or visible outer surface. For example, an aperture in the outer surface of a vehicle door may typically be required for a door handle to be mounted within the aperture.

As discussed further below, a handle assembly 30 including a base portion or applique 31 and a handle portion 104 pivotably mounted to the base portion 31 is mounted to an exterior surface or mounting region 27 of the door. The handle portion 104 is movable or pivotable relative to the base portion 31 between a recessed or retracted position, where the handle portion 104 is at least partially recessed at the base portion 31 and may be substantially flush with the base portion 31 and/or an outer surface of the door, and an extended or deployed position, where the handle portion 104 is moved from the recessed position outward from the door to be graspable by the user. When the latch mechanism 21' is unlocked or released so that the door 14 can be opened, the handle portion 104 is extended or deployed from the base portion 31 to the extended position so that the user may grasp the handle portion 104 and open the door. Thus, the handle assembly 30 is mountable to the vehicle door 14 without requiring an aperture formed through the outer surface of the door to accommodate the handle portion 104. The base portion 31 may be mounted to the exterior surface 27 of the door in any suitable manner, such as via an adhesive or glue disposed between the base portion and the exterior surface 27 of the door 14, or via fasteners, such as screws or snap-attaching fasteners or plastic press-fit fasteners, that attach the base portion to the door panel. Optionally, the handle assembly 30 may comprise a magnetic material and the base portion 31 may be magnetically mounted to the exterior surface of the door 14.

That is, the base portion or applique 31 may be mounted at (such as snap attached at) the mounting region 27 of the outer panel of the vehicle door 14, such as at the B-pillar of the vehicle door 14. With the applique 31 attached to the mounting region 27 of the outer panel of the vehicle door 14 and with the handle portion 104 movably disposed at the base portion 31, an outer surface of the handle portion 104 (and optionally a portion of the applique 31) provides a Class-A surface at the mounting region 27 of the door 14. For example, the base portion or applique may comprise a plastic or polymeric element and may be attached (via one or more fasteners) to the metal or plastic frame of the B-pillar of the door to provide the outer surface or Class-A surface at the B-pillar of the door. The outer surface of the handle portion 104, with the handle portion in the recessed position relative to the base portion 31, may be substantially aligned or flush or co-planar with the outer surface of the vehicle door 14 (the Class-A surface of the door) at or near or surrounding the mounting region 27. Further, a portion of the applique 31 may be substantially aligned or flush or co-planar with the outer surface of the vehicle door 14 at or near or surrounding the mounting region 27.

The handle assembly 30 may comprise any suitable type of handle assembly, and may include or incorporate aspects of the door handle assemblies described in U.S. Pat. Nos. 8,786,401; 6,977,619; 7,407,203; 6,349,450; 6,550,103; 6,907,643; 8,801,245 and/or 8,333,492, and/or U.S. Publication Nos. US-2022-0018168; US-2022-0282534; US-2022-0341226; US-2010-0088855; US-2010-0007463 and/or US-2020/0102773, and/or U.S. provisional patent applications, Ser. No. 63/369,781, filed Jul. 29, 2022; Ser. No. 63/373,870, filed Aug. 30, 2022, and/or Ser. No. 63/480,141, filed Jan. 17, 2023, which are all hereby incorporated herein by reference in their entireties. The handle may comprise a strap type handle, a paddle type handle, or other type of vehicle door handle assembly. Furthermore, aspects of the handle assembly 30 may be suitable for use with a liftgate handle assembly for a liftgate or tailgate of a vehicle.

Operation of the user interface 10 functions to release or unlock the latch mechanism 21' of the door 14 for movement of the door 14 relative to a body 24 of the vehicle 1 about hinges 16', 18' (FIG. 1C). The door 14 is movable between a closed position, where the door 14 is substantially flush with the body 24 of the vehicle 1, and an opened position, where the door 14 is pivoted relative to the body 24 of the vehicle 1 and away from the side of the vehicle to allow access to the interior 15 of the vehicle 1. A similar user interface (not shown) may be provided on the rear door 14 and interconnected to another latch mechanism (not shown) provided for locking and unlocking the rear door 14, or the liftgate of the vehicle. Optionally, the user interface 10 for opening the vehicle door 14 may be positioned on the B pillar 22. As discussed further below, the latch mechanism 21' may include an electrically operable actuator for controlling the locking and unlocking functions in association with a keyless entry system. The vehicle 1 also includes an A-pillar 20, the B-pillar 22 and a roof portion 26.

That is, the vehicle door 14 includes the latch mechanism 21' that controls locking and unlocking of the vehicle door 14. When the vehicle door 14 is closed and the latch mechanism 21' is locked or secured, the user is unable to move the vehicle door 14 from the closed position toward the opened position. When the vehicle door 14 is closed and the latch mechanism 21' is unlocked or released, the user (or an electrically operable actuator) is able to move the vehicle door 14 between the closed position and the opened position. The user interface 10 is disposed at or near the vehicle door 14 (such as at an outer surface of the door or a B-pillar of the vehicle) and may transmit a signal to the latch mechanism 21' to lock and unlock the vehicle door 14 based on a user input. For example, and as described further below, the user interface 10 may comprise a keypad configured to receive an alphanumeric code from a user and transmit the locking or unlocking signal based on the alphanumeric code or a touch sensitive surface comprising a capacitive sensor configured to transmit the signal in response to detecting presence of the user's hand at the user interface 10.

Figure 2:
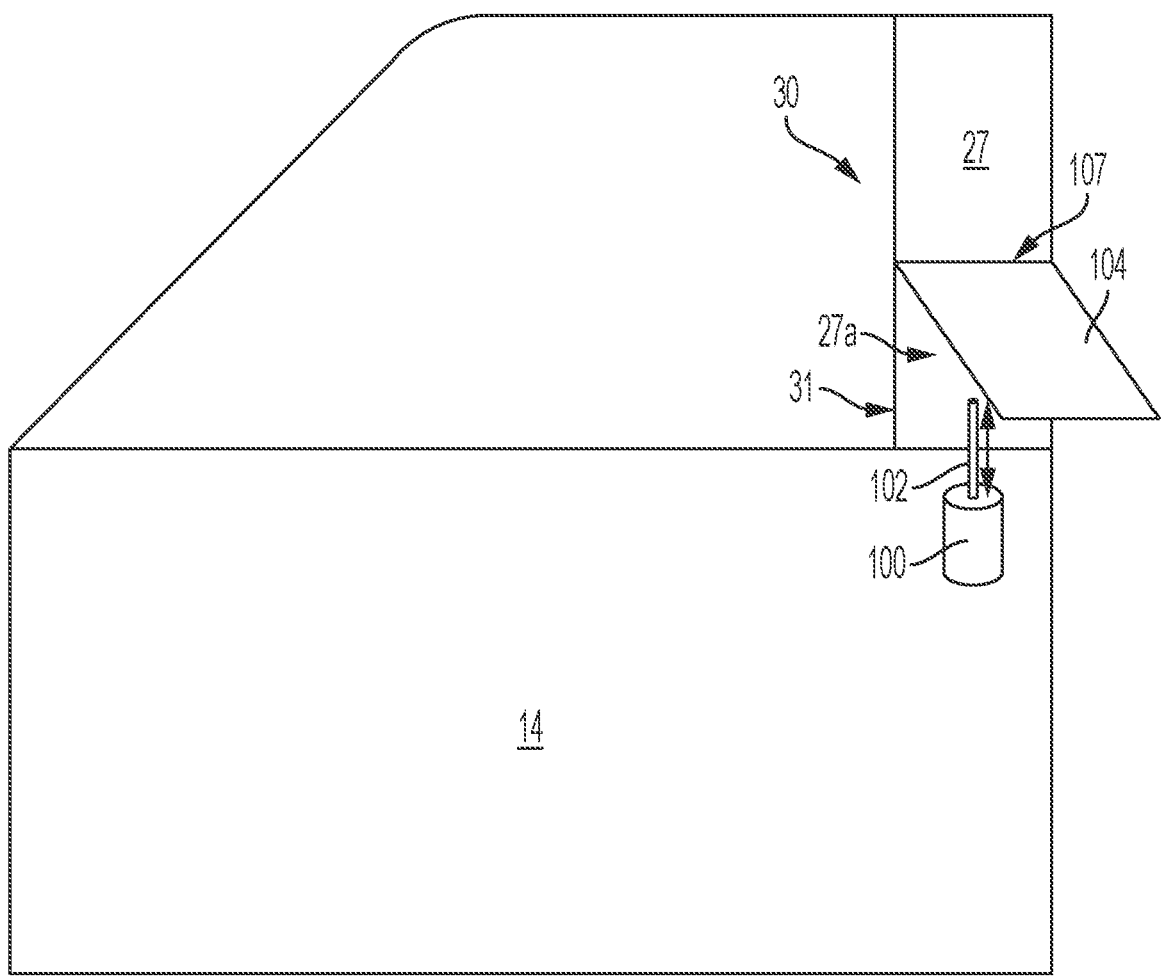
FIG. 2 is a plan view of the handle assembly of FIG. 1A disposed at a B-pillar of the vehicle and with the handle in the extended position.

Further, and as shown in FIGS. 1A, 1B, and 2, the handle assembly 30 is positioned at the mounting region or exterior surface 27 of the closure panel 14 and/or other vehicle surface(s) adjacent to the closure panel 14. For example, the handle assembly 30 may be disposed at the exterior surface 27 of the door 14 at a position corresponding to a traditional door handle assembly, or at the exterior surface 27 at the B-pillar 22. The handle assembly 30 may include the base portion or applique 31 (e.g., a Class-A surface) applied to the mounting region 27 (e.g., of the closure panel 14 and/or other portions of the vehicle 1, such as the B pillar 22). The handle 104 is coupled to the applique 31 and is graspable by the user to move the door 14 between the closed position and the opened position. Thus, the handle 104 is attached or coupled to the door 14 via the applique 31 and may be pivotable relative to the applique 31 between the recessed or retracted position and the extended or presented position. With the applique 31 applied to the exterior surface 27 of the vehicle, the handle 104 is coupled to the door 14 without need for an aperture formed through the door 14 to accommodate the handle 104 (such as to couple the handle to the latch mechanism, as in a typical vehicular door). In other words, the handle 104 of the handle assembly 30 does not project through any aperture at the mounting region 27, and the handle 104 is a component of the applique 31 that is applied to the mounting region or exterior surface 27. For example, the handle 104 may be pivotably coupled to the applique 31 by a hinge 107 of the applique 31.

In other words, because the latch mechanism 21 of the door may be locked and unlocked or secured and released, via the user interface 10 (which may communicate with the latch mechanism 21 via a wired or wireless connection), the door 14 may be moved between the closed position and the opened position by the user grasping the handle portion 104 of the handle assembly 30 coupled to the applique 31 that is disposed at the outer surface of the door 14 and without a portion of the handle 104 or applique 31 protruding through the outer surface of the door 14. Thus, the door 14 may be manufactured without an aperture for accommodating the handle 104, and the applique may be attached at the outer surface or side of the door. Further, and as discussed further below, the handle 104 of the handle assembly 30 is movable or pivotable relative to the applique 31 between the retracted position (where an outer surface of the handle 104 may correspond to or be substantially flush with an outer surface of the applique 31 and/or an outer surface of the vehicle door 14) and the extended position (where the user may grasp the handle 104 to move the door 14 between the closed position and the opened position).

Referring to FIGS. 1A, 1C, 2, and 4, an actuator 100 (e.g., an electrically operable motor) may be actuated to operate a control link 102 (e.g., a push rod). The actuator 100 may be electrically operated or controlled via an electronic control module 52', as discussed further below. The control link 102 is connected to the deployable handle 104, which is incorporated as part of the applique 31 (e.g., a Class-A surface) applied to the exterior surface 27 of the closure panel 14 and/or other portion of the vehicle 1. When the actuator 100 is electrically operated, the actuator 100 moves the control link 102 to push or pivot the handle 104 from the retracted or non-use position (e.g., where an outer surface of the handle 104 is substantially flush with a surface 27a of the applique 31) to the deployed or extended or use position (e.g., where the handle 104 is pivoted from the retracted position away from the applique 31 and the side of the vehicle to be at least partially spaced from the surface 27a of the applique 31 and graspable or grippable by a user to open the door).

That is, the actuator 100 is coupled to the handle 104 of the handle assembly 30 via the control link or push rod 102 for moving the handle 104 between the non-use position and the use position. When operated to move the handle 104 from the non-use position toward the use position (such as in response to the latch mechanism 21' releasing or unlocking the vehicle door 14), the actuator 100 extends the control link 102 toward the handle 104 and the handle 104 pivots outward from the applique 31 based on movement of the control link 102.

As shown in FIG. 1C, the control link 102 is coupled to the actuator 100 within an interior of the body 24 of the vehicle 1 and the control link 102 extends from inside the body 24 of the vehicle 1 and through an aperture 105 in the surface 27 toward the handle 104 that is situated with the applique 31 mounted on the exterior surface 27. Optionally, the control link 102 is coupled to the actuator 100 within the interior portion 34' of the door 14 and extends from inside the body of the door 14 and through the aperture 105 in the surface 27 to connect the actuator 100 with the handle 104 that is situated with the applique 31 mounted on the exterior surface 27. As such, the handle 104 (i.e., the structure having a body for grasping by a user of the vehicle 1) does not project into the interior portion of the body 24 or the interior portion 34' of the door 14. Rather, the control link 102 penetrates the surface 27 in order to couple the exterior mounted handle 104 with the interior mounted actuator 100. Thus, the control link 102 is not accessible by the user for use in manually opening the door 14 (i.e., facilitating the movement of the door 12 by the user about the hinges 16', 18'), and the handle 104 is accessible for grasping by the user when manually opening the door 14.

Referring to FIGS. 1B and 1C, a power door actuation system 20' includes an electrically operable swing door presenter mechanism or power swing door actuator 32'. The power swing door actuator 32' includes a powered door presenter assembly 22' that includes an electric motor 24', a reduction gear train 26', a slip clutch 28', and a drive mechanism 30'. The powered door presenter assembly 22' is mounted within the interior chamber 34' of the door 14 and is electrically operable to move the door 14 relative to the body 24 of the vehicle 1 when the latch mechanism 21 is released or unlocked. The presenter assembly 22' may also include a connector mechanism 36' configured to connect an extensible member of the drive mechanism 30' to a portion of the vehicle body 24. In some examples, the connector mechanism 36' of the presenter assembly 22' is spaced from or not engaged with or disconnected from a portion of the vehicle body 24 and, when the presenter assembly 22' is electrically operated, the connector mechanism 36' is configured to urge or push the door 14 from the closed position, where the door 14 is substantially flush with the vehicle body 24, to a presented position, where the door 14 is moved toward the opened position so that a gap separates the vehicle body 24 and a door edge 114' of the door 14 (such as a gap of 20 millimetres or more, 70 millimeters or more, 100 millimeters or more, and the like). Thus, with the door 14 in the presented position, the user may manually move the door further from the closed position to the opened position. The presenter assembly 22' further includes a support structure, such as an actuator housing 38', configured to be secured to the door 14 within the interior chamber 34' and configured to enclose the electric motor 24', the reduction gear train 26', the slip clutch 28', and the drive mechanism 30' therein.

Optionally, the power swing door actuator 32' may be operable to move the door from the closed or presented position to the opened position to provide a power open function of the door. For example, in response to receiving the user input at the user interface 10 to release the latch mechanism 21', the control module 52' may operate the power door actuator 32' to move the door from the closed position to the opened position so that the user may enter the vehicle. Optionally, the handle assembly 30 may move the handle 104 from the recessed position to the deployed position in the event that the power swing door actuator 32' fails to move the door from the closed position to the opened position. In other words, the handle assembly 30 may provide a manual backup for opening the door when the actuator 32' does not open the door.

The handle assembly 30 may incorporate components and functionality of the user interface assembly 10. In other words, the vehicle 1 could have a separate user interface assembly 10 and a separate handle assembly 30, such that the user interface assembly 10 is used to open or unlock the door 14 (e.g., to request opening of the latch assembly 21') and the handle assembly 30 is used by the operator to physically open the door 14 by way of the deployed handle 104, once the latch mechanism 21' is unlatched/unlocked. That is, the user interface assembly 10 may be operable to unlock or unlatch the door 14 and the handle assembly 30 may be operable to provide a grasping point for the user to grasp and manually open the door 14.

Referring to FIGS. 1A, 1B, 1C, and 4, the user interface 10 for the electronic latch system 21' in the closure panel 14 of the vehicle 1 is shown. The user interface assembly 10 includes a cover 10a, such as a bezel, defining a vehicle surface, such as a Class-A surface, and includes a force-based sensor that is actuated responsive to a force applied to the Class-A surface. In other words, the cover or bezel 10a of the user interface assembly 10 defines a Class-A surface of the vehicle and includes the sensor that may be actuated in response to a user input at the Class-A surface. For example, the sensor may include a force-based sensor that changes an electrical property, such as an increase in conductance or capacitance, in response to application of a physical force. Optionally, the sensor may be a capacitive switch that senses the presence of a nearby object by a change in capacitance or disruption in an emitted electromagnetic field.

An outer surface of the applique 31 and handle 104 may comprise a Class-A surface of the vehicle 1. Further, the applique 31 may include one or more sensors, such as force-based sensors or buttons 80. In the illustrated example, the Class-A surface of the cover 10a and the applique 31 presents an uninterrupted surface, which may be smooth for example, at least in a touch-sensitive region around the force-based sensor (e.g., the buttons 80 at the applique 31), and may be free of any through openings and/or gaps for independently moveable portions, such as the moveable body of a switch. Thus, the user interface 10 and/or the handle assembly 30 may provide respective Class-A surfaces (including, for example, the applique 31 with buttons 80).

Figure 4:
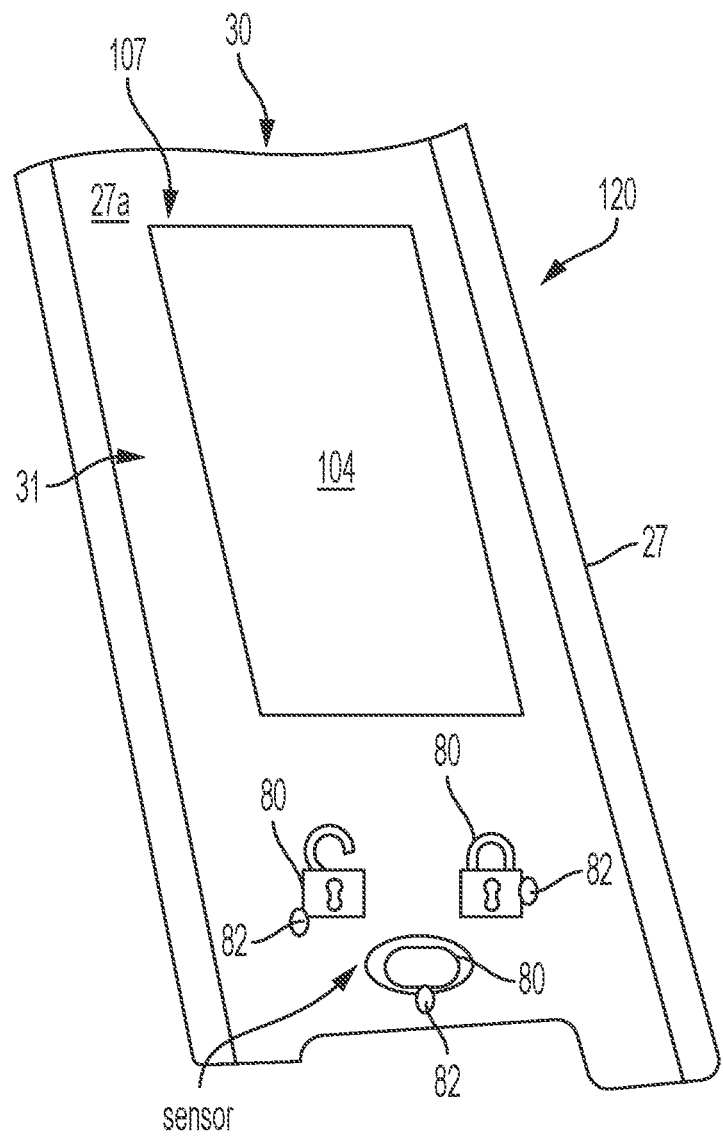
FIG. 4 is a perspective view of the handle assembly disposed in the recessed position.

In the illustrated example of FIG. 4, the handle assembly 30 and applique 31 includes a cover plate 120 that is positioned around the deployable handle 104. As shown, the handle assembly 30 includes a capacitive touch keypad unit (e.g., at the applique 31) including one or more buttons 80 on the applique 31. The one or more buttons 80 may be coupled to one or more light sources, such as light emitting diodes (LEDs) for illuminating the buttons. For example, the one or more LEDs may be disposed behind the applique 31 for backlighting icons at the applique 31 and corresponding to the respective buttons 80. The buttons 80 may include capacitive and/or resistive sensors 82 that, when the respective button 80 receives an input from a user, send signals to the control system 52' in order to instruct the operation of the deployable handle 104.

The one or more buttons 80, when actuated by the user, may control operation of any suitable function of the door or handle assembly 30. Further, the function of the button 80 may be marked on the applique 31. For example, the one or more buttons 80 may correspond to a Lock node (that when actuated by the user may lock the latch mechanism), a Release node (that when actuated by the user may release the latch mechanism and/or deploy the handle 104), and a wake-up switch (that when actuated by the user may control operation of the light sources that illuminate or backlight the one or more buttons). As such, the one or more buttons 80 (positioned on the applique 31) may incorporate a button mechanism or switch 82, such as a capacitive or resistive switch 82. The one or more buttons 80 may include alphanumeric icons or indications (e.g., a keypad with numbers zero through nine) to assist in entering an access code at the handle assembly 30. Optionally, the one or more buttons 80 may include Lock/Release capacitive type user-input interfaces a force-based user-input interface wake-up switch. That is, one or more buttons 80 may include capacitive switches 82 (e.g., one or more buttons that control the lock and unlock function of the door and/or handle assembly) and one or more buttons 80 may include force-based switches 82 (e.g., one or more buttons that wake-up or illuminate the handle assembly).

For example, the one or more buttons 80 of the applique 31 may include a touch-sensitive region configured to deflect and/or to deform in response to a force applied thereto, for example, by being pushed by a user's fingertip. Optionally, the surface 27a of the applique 31 surrounding the handle 104 may include a tactile feature (e.g., the button 80) disposed on the surface 27a, where the tactile feature can be formed to the configuration of braille, a raised or embossed logo, a symbol, text, a depression, or a protuberance, for indicating to a user either visually or tactilely the location of the force sensor/switch 82 disposed behind the surface 27a. As a result of the deflection or flexing of the touch-sensitive region, the force-based sensor 82 disposed beneath the surface 27a may register the touch. The force-based sensor 82 may be disposed adjacent a back side, opposite the Class-A surface 27a. The force-based sensor 82 may be configured to detect an application force on the touch sensitive region. Furthermore, a larger adjacent region surrounding the touch sensitive region may receive the application force and cause a deflection or flexing of the touch sensitive region of the surface 27a. Thus, a larger detection zone is possible to receive the force input or application force as compared with a physical switch, without accommodating a moveable body of the switch over the larger region. The one or more force-based sensors 82 may provide several advantages. For example, the one or more force-based sensors 82 may be actuated by a gloved hand and are not prone to false signals such as those caused by exposure to moisture or other environmental factors. The force-based sensor 82, instead, may rely on mechanical pressure to eliminate accidental activation.

Further, the user interface 10 and the handle assembly 30 may be provided collectively as an electronic applique assembly, which may be known as an eApplique or smart applique assembly (which may include the applique 31 and the control unit 52' with its own embedded control logic). A control strategy or control algorithm operated by the control system 52' (for the user interface 10 and/or the handle assembly 30) may be applied to our utilized by any HMI interface such as the one or more buttons 80 and one or more switches 82 (e.g., mechanical or electrical, such as capacitive or strain sensors), a keypad, a near-field communication (NFC) reader or sensor or transmitter, a camera, a radar, a gesture sensor, and the like).

Figure 3A:
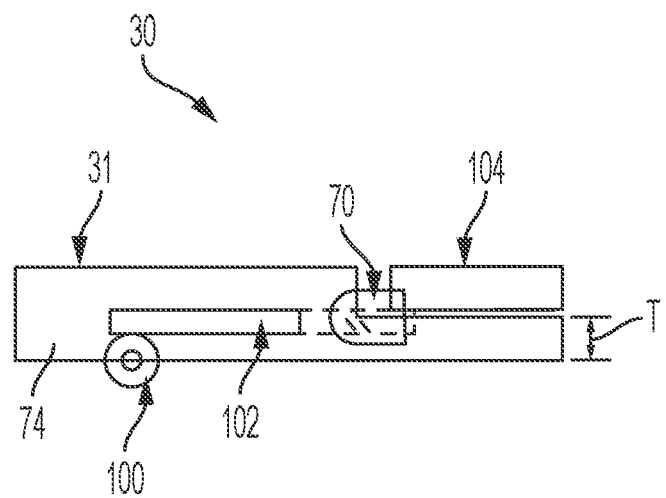
FIGS. 3A and 3B are side views of the handle assembly as the handle moves between the recessed position and the extended position.
Figure 3B:
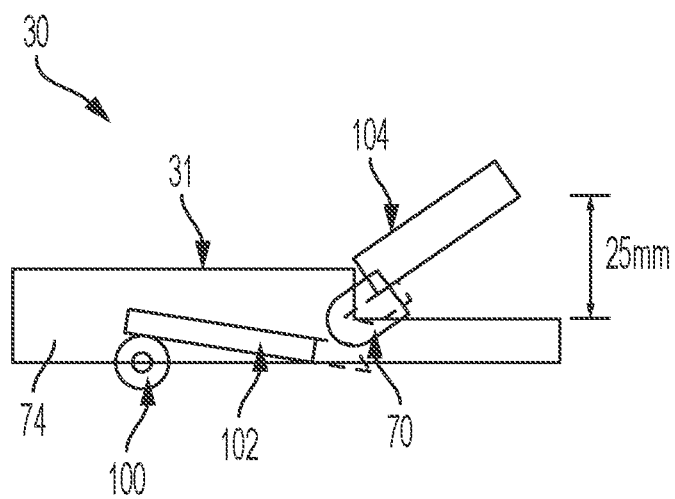

Referring to FIGS. 3A and 3B, the handle assembly 30 includes the hinge or pivot 70 with ramp elements 72. Optionally, the ramp elements 72 may be formed on the handle 104 at or near the hinge or pivot 70 and the ramp elements 72 may be disposed on a body 74 of the applique 31. That is, the hinge or pivot 70 with the ramp element 72 is coupled to the body 74 of the applique 31 and the handle 104 is coupled to the pivot 70. The ramp element 72 may comprise an angle that is sufficient to impart rotation of the handle 104 about the pivot 70 when the push rod 102 engages the ramp element 72 and moves along the ramp element 72. The pivot 70 may also be referred to as the hinge 107 (e.g., FIG. 2).

The push rod or control link 102 may includes one of the ramps 72 and the control link ramp 72 engages or mates with the ramp 72 positioned on the body 74 of the applique 31. The control link ramp 72 has an angle configured to impart rotation of the handle 104 about the pivot 70 when the control link 102 is moved by the actuator 100 to engage the pivot 70. That is, the push rod 102 may have a corresponding ramp interface or element 72 at the end of the push rod 102 that engages the ramp element 72 at the pivot 70 so that, when the actuator 100 is actuated to move the handle 104 between the retracted position and the extended position, the push rod 102 is moved along the pivot 70 and engagement of the ramped interfaces pivots the handle 104 about pivot 70 relative to the applique 31.

Thus, the handle assembly 30 for the closure panel 14 of the vehicle 1 may include the body 74 including the applique 31 for mounting on the external surface 27 of the vehicle 1 associated with the closure panel 14. The applique 31 includes the surface 27a spaced apart from the exterior surface 27 by the thickness T of the body 74. The deployable handle 104 is mounted on the surface 27a by the pivot 70, such that the deployable handle 104 is moveable between the retracted position and the deployed position. The control link 102 is coupled to the handle 104 and coupled to the actuator 100. The actuator 100 is positioned behind the exterior surface 27 (e.g., on a backside of the exterior surface). When the actuator 100 is actuated, the actuator 100 moves the handle 104 between the retracted position and the deployed position.

Optionally, the pivot 70 includes the hinge 107 and may be formed as part of the body 74 of the applique 31. Optionally, the applique 31 includes at least one button 80 having the button or switch or sensor mechanism 82, such that when activated by the button 80, the button mechanism 82 provides a signal for controlling the actuator 100. Optionally, the control link 102 passes through the aperture 105 in the exterior surface 27 (FIG. 1C) to engage the pivot 70. Optionally, the control link 102 passes through an aperture in the exterior surface of the closure panel 14 and the actuator 100 is positioned in the interior 34' of the closure panel 14. Optionally, the control link 102 passes through an aperture in the exterior surface of the B-pillar 22 and the actuator 100 is positioned in an interior of the body 24 of the vehicle 1. Optionally, the body 74 of the applique 31 is a plastic material.

Figure 5A:
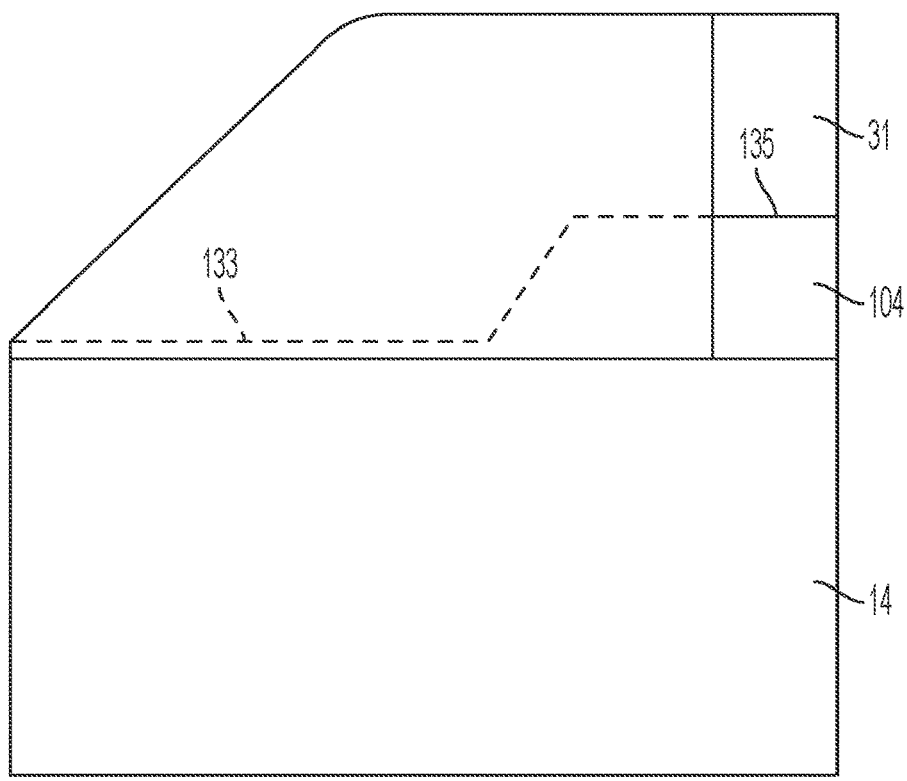
FIGS. 5A and 5B are plan views of a vehicle door with the belt line and window of the vehicle door aligned with the edges of the handle assembly.
Figure 5B:
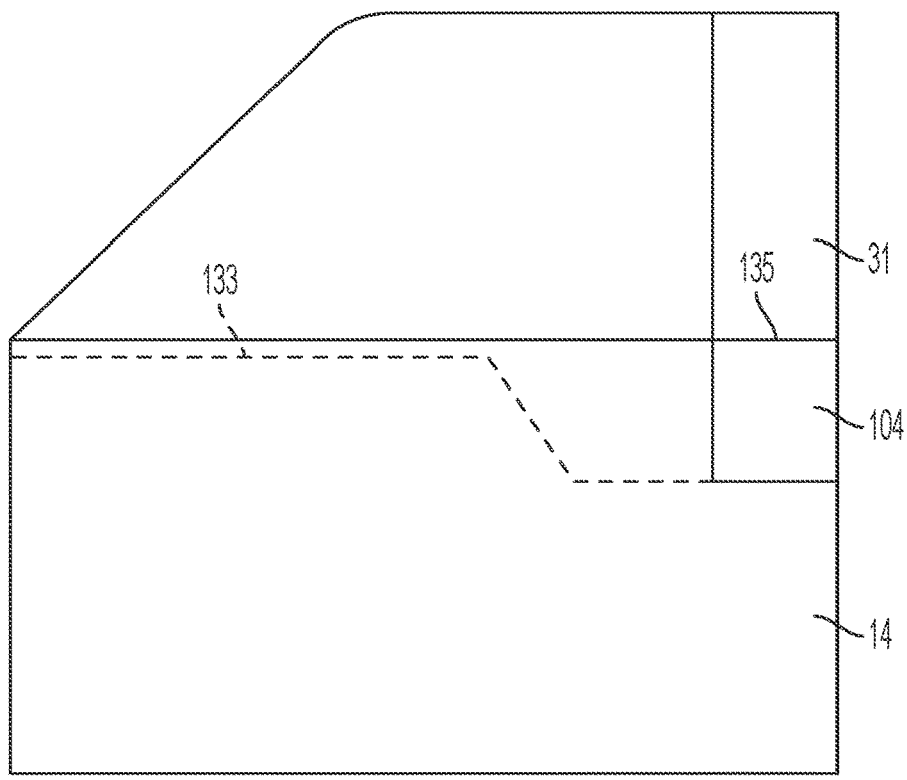

As shown in FIGS. 5A and 5B, the handle assembly 30 includes the handle 104 that is provided as part of the applique 31, which may benefit from the interfaces between the windows of the vehicle 1 and the vehicle belt line 133 (i.e., the edge or body line between the vehicle door and the vehicle window) to hide the handle 104. Advantageously, only one new line going across the handle 104 is used. For example, a gap or interface 135 provided between the handle 104 and the applique 31 may be aligned with the belt line 133, as shown in FIG. 5A. That is, the belt line 133 and gap or interface 135 between the handle 104 and applique 31 may be aligned. The belt line 133 may be adjusted (i.e., the shape of the door panel or window may be adjusted) to align the belt line 133 and gap 135, or the handle assembly 30 may be positioned to align the gap 135 with the belt line 133. Further, since the handle 104 in the applique 31 is provided in a compact packaging area, the motor 100 may be placed in the cavity 34' of the vehicle door 14. The control link or linkage mechanism 102 then connects the handle 104 to the motor 100 in the vehicle door cavity 34'. As such, no additional apertures need to be formed at the mounting region 27 of the door 14 in order to accommodate the handle 104 itself.

Figure 6:
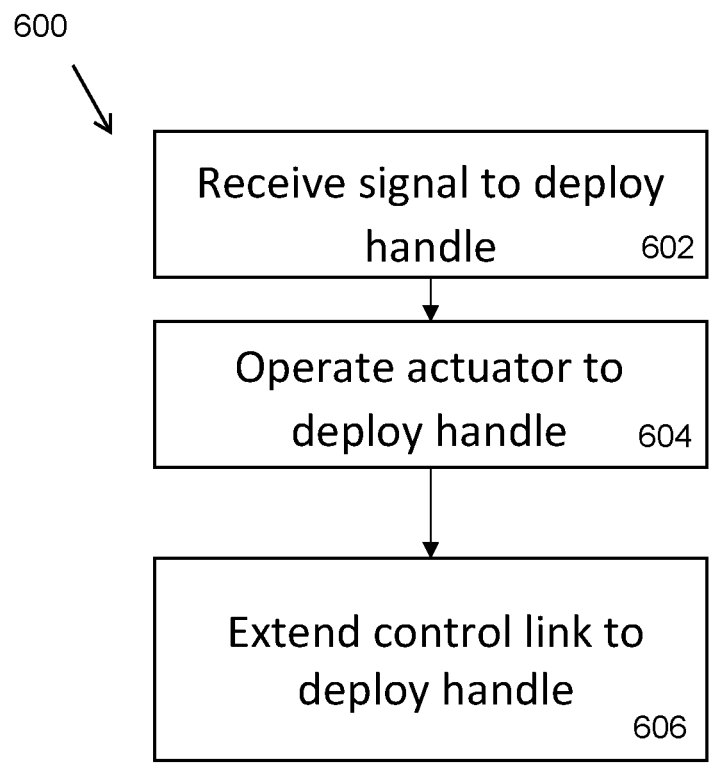
FIGS. 6-8 are flow diagrams depicting example methods of operating the handle assembly.

Referring to FIG. 6, a method 600 for moving the deployable handle 104 of the handle assembly 30 for the closure panel 14 of the vehicle 1 includes, at operation 602, receiving a signal for deploying the deployable handle 104, where the deployable handle 104 is mounted on the surface 27a of the applique 31 of the handle assembly 30 by the pivot 70, such that the deployable handle 104 is spaced apart from the exterior surface 27 of the vehicle 1 by the thickness T of the body 74. The signal may be responsive to the latch mechanism 21' being unlocked or released via the user input at the user interface 10. The method 600 includes, at operation 604, operating the actuator 100 to control the control link 102 connected to the deployable handle 104. The control link 102 passes through the aperture 105 of the exterior surface 27. The method 600 includes, at operation 606, moving the deployable handle 104 between the deployed position and the retracted position by manipulation of the control link 102 by the actuator 100.

Figure 7:
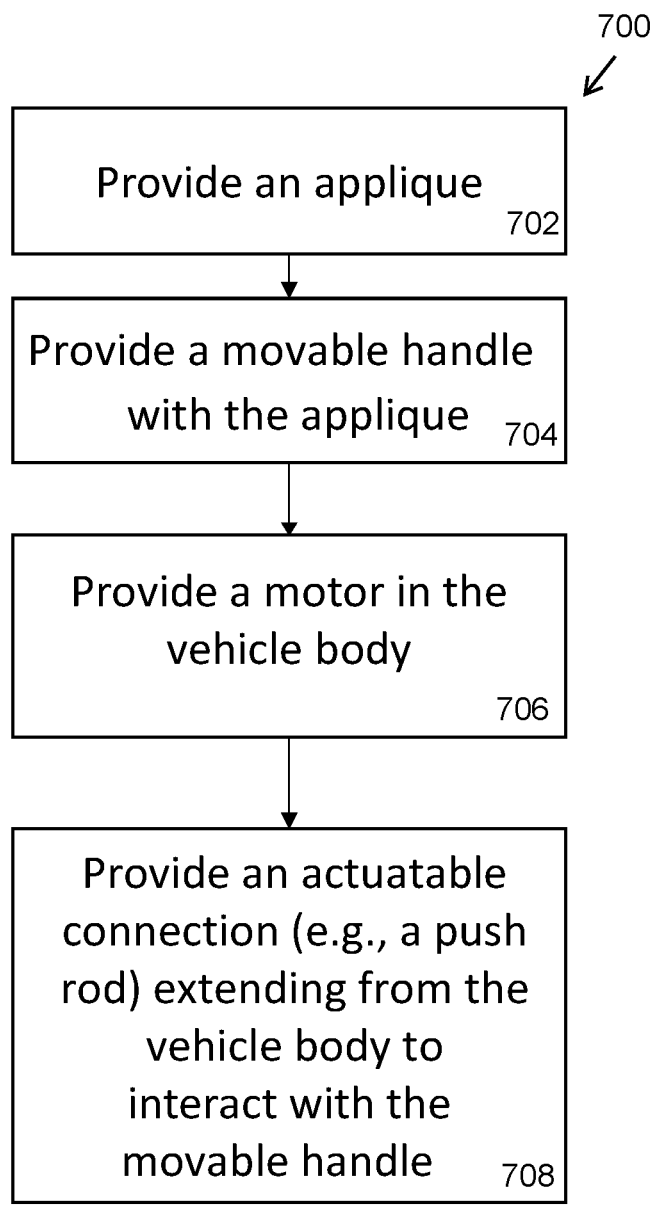

Referring to FIG. 7, a system or process or method 700 for assembling the handle assembly 30 configured for attachment at the vehicle door 14 includes, at operation 702, providing an applique 31 that is mountable at the exterior or outer surface of the door 14. At operation 704, the method 700 includes pivotably attaching the movable handle 104 at the applique 31. At operation 706, the method 700 includes disposing the actuator 100 or electrically operable motor at an interior portion of the vehicle body, such as within the interior compartment of the door 14. At operation 708, the method 700 includes mechanically coupling the actuator 100 and the movable handle 104 (e.g., via the push rod 102) so that, when the actuator 100 is electrically operated, the handle moves between the retracted position and the extended position.

Figure 8:
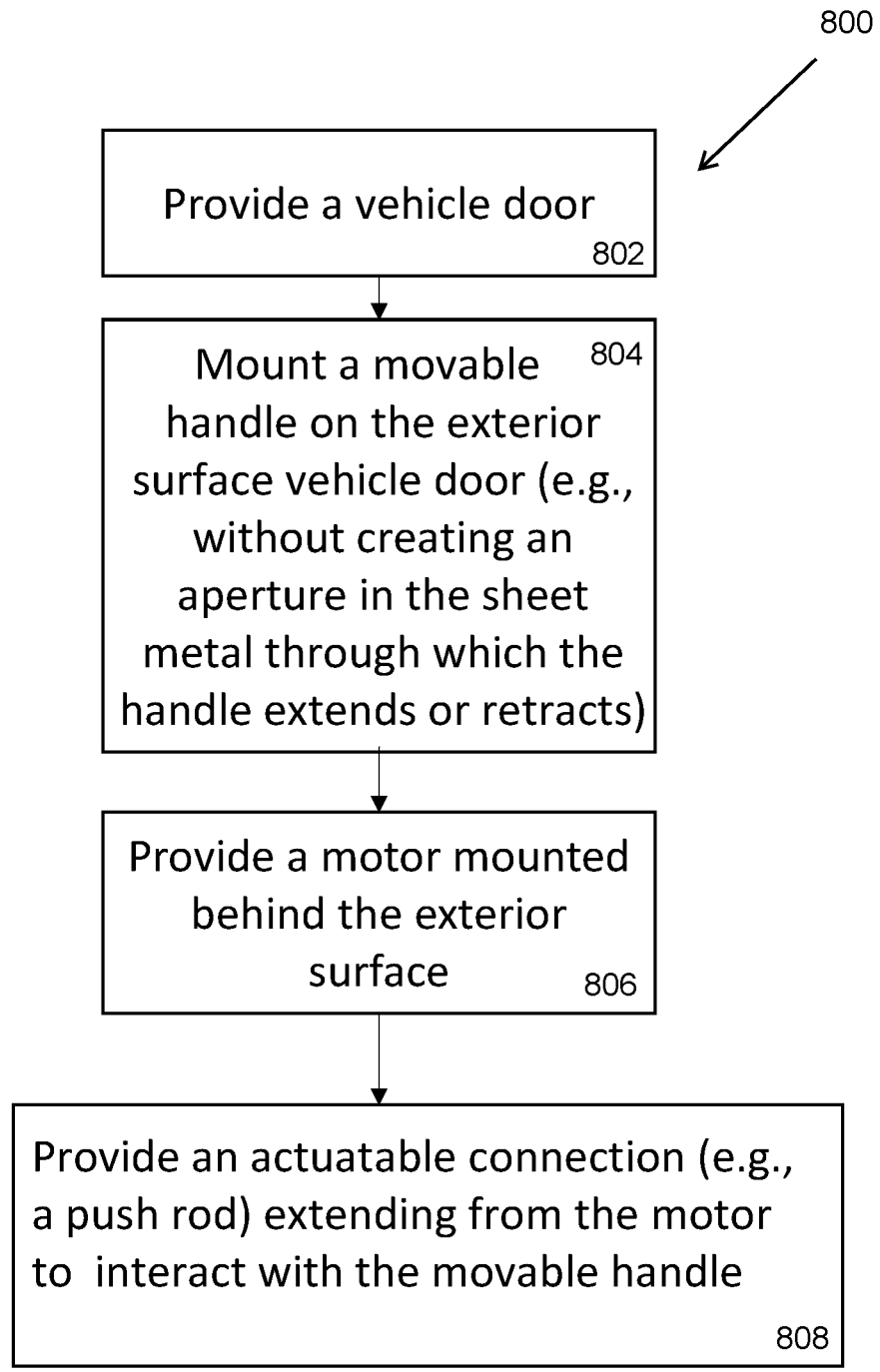

Referring to FIG. 8, a system or process or method 800 for assembling the handle assembly 30 at the vehicle door 14 includes, at operation 802, providing the vehicle door 14. At operation 804, the method 800 includes mounting the movable handle 104 on the exterior surface of the door 14 without positioning the handle 104 at an aperture through the exterior surface of the door 14, such as via the applique 31. At operation 806, the method 800 includes disposing the actuator or electrically operable motor 100 behind the exterior surface of the door 14, such as within the interior portion of the door panel. At operation 808, the method 800 includes mechanically coupling the actuator 100 and the movable handle 104 (e.g., via the push rod 102) so that, when the actuator 100 is electrically operated, the handle 104 moves between the retracted position and the extended position.

As shown in FIG. 1C, the electronic control system or module 52' is in communication with the electric motor 24' for providing electric control signals thereto. That is, the control module 52' is electrically coupled to the electric motor 24' for controlling operation of the electric motor 24', such as to move the door 14 from the closed position to the presented position. The electronic control module 52' may be in communication with the user interface assembly/system 10 for receiving control signals thereto, for example the control signals from the user interface assembly 10 may command the electronic control module 52' to control actuation system 20'. The electronic control module 52' may include a microprocessor 54' and a memory 56' having executable computer readable instructions stored thereon for execution by the microprocessor 54'. The electronic control module 52' may include hardware and/or software components. The electronic control module 52' may be integrated into, or directly connected to, the actuator housing 38', or may be a remotely located device within the door chamber 34', or may be integrated into the latch assembly 21' that latches the door 14 to the body 24 (e.g., such as using a ratchet, pawl and striker arrangement).

Optionally, the electric motor 24' may include one or more Hall effect sensors for monitoring a position and speed of the vehicle door 14 during movement of the vehicle door 14 between the open position and the closed position. For example, one or more Hall effect sensors may be provided and positioned to send signals to the electronic control module 52' that are indicative of rotational movement or position of the electric motor 24' and/or indicative of the rotational speed of the electric motor 24'. For example, rotational movement or position and/or rotational speed of the electric motor 24' may be determined based on counting signals from the Hall effect sensor detecting a target on a motor output shaft of the electric motor 24'.

Where the sensed motor speed is greater than a threshold speed and where the current being supplied to the motor 24'

(e.g., as detected by a current sensor or sensing circuitry) registers a significant change in the current draw, the electronic control module 52' may determine that the user is manually moving door 14 while the electric motor 24' is also operating. The electronic control module 52' may then send a signal to the electric motor 24' to stop the motor 24' and may disengage the slip clutch 28' to facilitate manual override movement.

When the electronic control module 52' is in a power open or power close mode (i.e., the electric motor is electrically operated to move the door between the open position and the closed position) and the one or more Hall effect sensors indicate that a speed of the electric motor 24' is less than a threshold speed (e.g., zero) and a current spike is registered either directly or indirectly by the microprocessor 54' and/or any current sensing circuitry, the electronic control module 52' may determine that an obstacle is in the way of the vehicle door 14. If the system determines that an obstacle is blocking the door, the electronic control system 52' may take any suitable action, such as sending a signal to turn off the electric motor 24'. As such, the electronic control module 52' receives feedback from the one or more Hall effect sensors to ensure that contact with an obstacle has not occurred during movement of vehicle door 14 between the closed position and the opened position or the presented or partially-open position. Other position sensing techniques to determine that the door 14 is being moved, either by the electrical motor 24' and/or a manual user control (e.g., via the deployed handle 104 of the handle assembly 30) are also possible.

Optionally, Hall effect sensors may be used for monitoring a position and/or movement speed of the handle 104 during movement of the handle 104 between the retracted position and the deployed position. As such, the position sensors could be used by the control system 52' to instruct the operation of the actuator 100 accordingly.

As shown in FIG. 1C, the electronic control module 52' may be in communication with a remote key fob 60' and/or with an external door-mounted switch 62' for receiving a request from a user to open or close the vehicle door 14. The external door-mounted switch 62' may comprise a contact-based switch, such as a piezoelectric switch. Optionally, the external door-mounted switch 62' comprises a contactless switch, such as a capacitive sensor. Thus, the electronic control module 52' receives a command signal from a remote key fob via a key fob sensor 60' and/or a door switch 62' to initiate an opening or closing of the vehicle door 14. Upon receiving a command, the electronic control module 52' proceeds to provide a signal to the electric motor 24', such as in the form of a pulse width modulated voltage for speed control, to actuate the motor 24' and initiate pivotal movement of the vehicle door 14. While providing the signal, the electronic control module 52' also obtains feedback from the Hall effect sensors of the electric motor 24' to determine whether contact between the door 14 and an obstacle has occurred. If contact with an obstacle has not occurred, the motor 24' will continue to generate a rotational force to actuate the spindle drive mechanism 30'. Once the vehicle door 14 is moved to a desired position (e.g., the closed position, the opened position, the presented position, a partially opened position, and the like), the motor 24' is turned off and self-locking gearing associated with the gearbox 26' causes the vehicle door 14 to be held at the desired position, thereby providing an automatic door checking function. While the vehicle door 14 is locked at the desired position, if a user applies a manual force on the door to try to move the vehicle door 14 toward a different operating position, the electric motor 24' and the gearbox 26' may resist the user's manual force to retain the vehicle door 14 in the locked position (thereby replicating a door check function). If the user continues to apply the manual force (e.g., for a threshold period of time), or if the user applies a significant enough manual force (e.g., a force above a threshold level of force), the electric motor 24' and the gearbox 26' may release and allow the door 14 to move according to the user's manual force toward the newly desired position. Once the vehicle door 14 is stopped at the new position (e.g., the door closes or the door reaches a fully opened position), the electronic control module 52' may provide the required power to the electric motor 24' to hold the door 14 in the new position. If the user provides a sufficiently large motion input to the vehicle door 14 (e.g., such as when the user wants to close the door), the electronic control module 52' may sense or recognize this motion via the Hall effect pulses and proceed to execute a full closing operation for the vehicle door 14.

The remote key fob 60' and/or the external door-mounted switch 62' may be used to activate the actuator 100 and thus facilitate deployment of the handle 104 by operating the control link 102 (via the actuator 100). In other words, in response to a user input at the key fob 60' and/or the external door-mounted switch 62', the actuator 100 may be electrically operated to move the handle 104 relative to the applique 31 between the retracted position and the extended position. For example, a first input at the key fob 60' and/or door-mounted switch 62' may operate the electric motor 24' to move the vehicle door 14 and a second input at the key fob 60' and/or door-mounted switch 62' may operate the actuator 100 to move the handle 104.

The electronic control module 52' may receive an input from a proximity sensor, such as a radar sensor 64' positioned on a portion of a vehicle door 14, such as on a door mirror or the like. The radar sensor 64' may be configured to detect if an obstacle, such as another car, tree, or post, is near or in close proximity to the vehicle door 14. If the radar sensor 64' detects that an obstacle is present while the electric motor 24' is being operated to move the vehicle door 14, the radar sensor 64' may send a signal to the electronic control module 52' and the electronic control module 52' may turn off the electric motor 24' to stop movement of the vehicle door 14, thereby preventing the vehicle door 14 from hitting the obstacle. This provides a non-contact obstacle avoidance system. Optionally, the radar sensor 64' may detect the obstacle before the electric motor 24' is operated to open the door 14 and, in response to detecting presence of the obstacle in the swing path of the door 14, the electronic control module 52' may not begin operating the electric motor 24' to open the door 14. Moreover, based on detection of the obstacle by the radar sensor 64', the electronic control module 52' may adjust operation of the electric motor 24' to adjust the swing path of the door 14 to avoid contact with the obstacle. That is, the electric motor 24' may be operated to open the door 14 only as much as the door 14 may open without contacting the detected obstacle.

Optionally, a contact obstacle avoidance system, such as a pinch detection system, may include a contact sensor 66' mounted to the door 14, such as in association with a molding component of the door 14. The contact sensor 66' may be operable to detect or determine presence of an obstacle, such as a user's finger or hand, in a gap between the vehicle body 24 and the door 14. Based on detection of the obstacle in the gap between the vehicle body 24 and the vehicle door 14, the contact sensor 66' sends a signal to the electronic control module 52' and the electronic control module 52' may stop or limit operation of the motor 24' during a door close operation to avoid closing the vehicle door 14 with the obstacle present in the gap between the door and body.

Optionally, the radar sensor 64' may be positioned at or near the applique 31 and/or the handle 104 to determine presence of obstacles at or near the handle 104 and in the path of motion of the handle 104. If an obstacle is detected at or near the handle 104, operation of the actuator 100 may be limited in deploying the handle 104, such as to prevent the handle 104 from deploying or to limit deployment of the handle 104 and avoid contact with the detected obstacle.

Furthermore, the contact sensor 66' may be positioned at or near the applique 31 and/or the handle 104 to determine presence of obstacles between the handle 104 and the applique 31 when the handle 104 is in the extended position. Thus, if an obstacle is detected between the deployed handle 104 and the applique 31, operation of the actuator 100 to move the handle 104 toward the retracted position may be limited to avoid pinching or trapping the obstacle between the handle 104 and the applique 31.

As shown in FIG. 1C, the power door actuation system 20' and latch assembly 21' may include a latch mechanism 70', a latch release mechanism 72', and a power-operated release actuator, such as an electric power release motor 74'. The control module 52' may communicate with the electric power release motor 74' to act as a latch controller for controlling operation of the latch assembly 21'. Optionally, the latch assembly 21' may include a dedicated latch controller 40. The control module 52' may thus comprise an integrated configuration, where the control module 52' controls operation of the presenter assembly 22' for moving the door 14 relative to the vehicle body 24, and the control module 52' controls operation of the latch assembly 21' for locking and unlocking the door 14 to allow or prevent the door 14 from moving from the closed position relative to the vehicle body 24. Optionally, the vehicle may include a pair of distinct controllers, with the control module 52' associated with and controlling operation of the presenter assembly 22', and the latch controller 40 associated with and controlling operation of the latch assembly 21'. The key fob sensor 60' and/or the door switch 62' may be used to authenticate the user and control the power release (and power lock) function.

Although shown and described as being a generally vertically oriented handle portion that moves laterally from the side of the vehicle, it is envisioned that the handle of the extendable flush door handle assembly may be oriented in any manner. For example, the handle may be oriented so that it is either vertical, horizontal, or diagonal with respect to the ground. Also, although shown and described as an exterior door handle for opening a side door or rear door or lift gate of a vehicle from exterior the vehicle, it is envisioned that the extendable flush door handle assembly may be suitable for use as an interior handle for opening a side door or rear door or liftgate of a vehicle from inside the vehicle.

Optionally, the door handle assembly may include a light module or lighting element, such as for illuminating the applique or the movable handle portion or the inner portion of the door handle portion, so that the user can readily see and discern the door handle when approaching the vehicle in low lighting conditions. The lighting element may comprise a strip light or pocket light or the like, and the door handle assembly may include a ground illumination light and/or other light or lighting element, such as a projection light or the like, such as by utilizing aspects of the door handle assemblies and lighting systems described in U.S. Pat. Nos. 11,441,338; 8,786,401; 8,801,245; 5,371,659; 5,497,305; 5,669,699; 5,823,654; 6,349,450 and/or 6,550,103, and/or U.S. Patent Pub. Nos. US-2023-0001849 and/or US-2021-0332619, which are all hereby incorporated herein by reference in their entireties.

Optionally, the door handle assembly or module or the user interface may include or may be associated with an antenna for receiving signals from or communicating with a remote device. For example, the antenna (such as, for example, an antenna of the types described in U.S. Pat. No. 6,977,619 and/or U.S. Publication Nos. US-2021-0370877 and/or US-2010-0007463, which are hereby incorporated herein by reference in their entireties) may communicate a signal to the door locking system via a wire connection or the like, or wirelessly, such as via a radio frequency signal or via an infrared signal or via other wireless signaling means. For example, the handle assembly may include an antenna or sensor (such as an antenna and/or capacitive sensor) at the handle portion and/or may include a passive entry device or element. The antenna or sensor and/or passive entry device may receive a signal from a transmitting device (such as from a key fob or the like carried by the driver of the vehicle) and/or may sense or detect the presence of or proximity of a person or person's hand at or near the door handle, and may generate an output signal indicative of such detection. The actuator may be responsive to the antenna and/or sensor and/or device to impart an outward movement of the door handle portion so that the user can grasp the handle portion to open the door of the vehicle.

Such connections can include cables, wires, fiber optic cables or the like. The communication to the locking system may be via a vehicle bus or multiplex system, such as a LIN (Local Interconnect Network) or CAN (Car or Controlled Area Network) system, such as described in U.S. Pat. Nos. 6,291,905; 6,396,408 and/or 6,477,464, which are all hereby incorporated herein by reference in their entireties. The vehicle door may then be unlocked and/or the illumination source or sources may be activated as a person carrying a remote signaling device approaches the door handle. Optionally, other systems may be activated in response to the remote signaling device, such as vehicle lighting systems, such as interior lights, security lights or the like (such as security lights of the types disclosed in U.S. Pat. Nos. 6,280,069; 6,276,821; 6,176,602; 6,152,590; 6,149,287; 6,139,172; 6,086,229; 5,938,321; 5,671,996; 5,497,305; 6,416,208 and/or 6,568,839, all of which are hereby incorporated herein by reference in their entireties), or the vehicle ignition, or any other desired system.

In the preceding description, for purposes of explanation, numerous details are set forth in order to provide a thorough understanding of the embodiments. However, it will be apparent to one skilled in the art that these specific details may not be required. In other instances, well-known structures are shown in block diagram form in order not to obscure the understanding. For example, specific details are not provided as to whether some of the embodiments described herein are implemented as a software routine running on a processor via a memory, hardware circuit, firmware, or a combination thereof.

Changes and modifications to the specifically described embodiments may be carried out without departing from the principles of the present invention, which is intended to be limited only by the scope of the appended claims as interpreted according to the principles of patent law.

The invention claimed is:

1. A vehicular exterior door handle assembly, the vehicular exterior door handle assembly comprising:

a base portion configured to mount at a vehicle door;
wherein the base portion, when mounted at the vehicle door, is disposed along an outer surface of a frame of the vehicle door;
a handle portion including a grasping portion;
wherein the handle portion is movable relative to the base portion between (i) a recessed position, where the grasping portion of the handle portion is at least partially recessed at the base portion, and (ii) a deployed position, where the grasping portion of the handle portion protrudes outward from the base portion so as to be graspable by a user;
wherein, with the base portion mounted at the vehicle door and with the handle portion in the recessed position, (i) the handle portion is outboard of the outer surface of the frame of the vehicle door and (ii) no portion of the handle portion extends inboard of an innermost part of the base portion toward the outer surface of the frame of the vehicle door;
wherein, with the base portion mounted at the vehicle door and with the handle portion in the recessed position, an outer surface of the base portion and an outer surface of the handle portion are exposed at and establish respective Class-A surfaces at the vehicle door, and wherein the outer surface of the base portion and the outer surface of the handle portion are flush with a Class-A surface of the vehicle door adjacent the vehicular exterior door handle assembly;
a deployment mechanism, wherein the deployment mechanism, with the base portion mounted at the vehicle door, is coupled to the handle portion and operable to move the handle portion between the recessed position and the deployed position;
a control module comprising electronic circuitry is disposed remote from the vehicular exterior door handle assembly, wherein the control module is configured to control a latch mechanism of the vehicle door;
wherein the control module, based on a user input, actuates the latch mechanism of the vehicle door to unlock the vehicle door;
wherein the deployment mechanism, with the base portion mounted at the vehicle door, and responsive to the control module actuating the latch mechanism to unlock the vehicle door, is electrically operated to move the handle portion from the recessed position to the deployed position; and
wherein, with the handle portion in the deployed position and the door unlocked, the handle portion is graspable by the user to open the vehicle door.

2. The vehicular exterior door handle assembly of claim 1, wherein the deployment mechanism comprises an electrically operable actuator and a control link, and wherein the control link, with the base portion mounted at the vehicle door, is mechanically coupled to the handle portion, and wherein the electrically operable actuator, when the deployment mechanism is operated to move the handle portion between the recessed position and the deployed position, is electrically operated to move the control link relative to the electrically operable actuator between a retracted position and an extended position.

3. The vehicular exterior door handle assembly of claim 2, wherein the handle portion, when the control link is in the retracted position, is in the recessed position, and wherein the handle portion, when the control link is moved from the retracted position toward the extended position, moves from the recessed position toward the deployed position.

4. The vehicular exterior door handle assembly of claim 2, wherein the electrically operable actuator is disposed at an interior portion of the vehicle door.

5. The vehicular exterior door handle assembly of claim 4, wherein the control link, with the base portion mounted at the vehicle door, extends through an aperture formed in the outer surface of the frame of the vehicle door to engage the handle portion.

6. The vehicular exterior door handle assembly of claim 2, wherein, with the base portion mounted at the vehicle door, the electrically operable actuator and the control link are accommodated by the base portion at the vehicle door.

7. The vehicular exterior door handle assembly of claim 1, wherein the handle portion is pivotably mounted at the base portion, and wherein the handle portion is pivotable relative to the base portion between the recessed position and the deployed position.

8. The vehicular exterior door handle assembly of claim 7, wherein the handle portion is pivotably mounted at the base portion via a pivot element, and wherein the deployment mechanism, with the base portion mounted at the vehicle door, engages the pivot element to move the handle portion between the recessed position and the deployed position.

9. The vehicular exterior door handle assembly of claim 8, wherein the pivot element comprises a ramped interface, and wherein the deployment mechanism comprises a corresponding ramped interface, and wherein, when the deployment mechanism is operated to move the handle portion between the recessed position and the deployed position, the ramped interface of the deployment mechanism moves along the ramped interface of the pivot element to pivot the handle portion relative to the base portion between the recessed position and the deployed position.

10. The vehicular exterior door handle assembly of claim 1, wherein the base portion comprises an applique configured to mount at the vehicle door.

11. The vehicular exterior door handle assembly of claim 1, wherein the base portion comprises an applique configured to mount along a B-pillar of the frame of the vehicle door.

12. The vehicular exterior door handle assembly of claim 1, wherein the user input comprises a signal from a remote device of the user.

13. The vehicular exterior door handle assembly of claim 1, wherein the user input is received at a user interface disposed at the vehicle door.

14. The vehicular exterior door handle assembly of claim 13, wherein the user interface is disposed at the vehicle door and remote from the base portion.

15. The vehicular exterior door handle assembly of claim 13, wherein the user interface is disposed at the base portion.

16. The vehicular exterior door handle assembly of claim 1, wherein the handle portion, with the base portion mounted at the vehicle door and with the handle portion in the recessed position, does not penetrate the outer surface of the frame of the vehicle door and no portion of the handle portion is disposed inboard of the outer surface of the frame of the vehicle door with the handle portion in the recessed position.

17. A vehicular exterior door handle assembly, the vehicular exterior door handle assembly comprising:
a base portion configured to mount at a frame of a B-pillar of a vehicle door,
wherein the base portion comprises an applique;
a handle portion including a grasping portion;

wherein the handle portion is movable relative to the base portion between (i) a recessed position, where the grasping portion of the handle portion is at least partially recessed at the base portion, and (ii) a deployed position, where the grasping portion of the handle portion protrudes outward from the base portion so as to be graspable by a user;

wherein the handle portion is pivotably mounted at the base portion, and wherein the handle portion is pivotable relative to the base portion between the recessed position and the deployed position;

wherein, with the base portion mounted at the frame of the B-pillar of the vehicle door and with the handle portion in the recessed position, (i) the handle portion is outboard of the frame of the B-pillar of the vehicle door and (ii) no portion of the handle portion extends inboard of an innermost part of the base portion toward the frame of the B-pillar of the vehicle door;

wherein, with the base portion mounted at the frame of the B-pillar of the vehicle door and with the handle portion in the recessed position, an outer surface of the applique and an outer surface of the handle portion are exposed at and establish respective Class-A surfaces at the B-pillar of the vehicle door, and wherein the outer surface of the applique and the outer surface of the handle portion are flush with a Class-A surface of the B-pillar of the vehicle door adjacent the vehicular exterior door handle assembly;

a deployment mechanism, wherein the deployment mechanism, with the base portion mounted at the frame of the B-pillar of the vehicle door, is coupled to the handle portion and operable to move the handle portion between the recessed position and the deployed position;

a control module comprising electronic circuitry is disposed remote from the vehicular exterior door handle assembly, wherein the control module is configured to control a latch mechanism of the vehicle door;

wherein the control module, based on a user input, actuates the latch mechanism of the vehicle door to unlock the vehicle door;

wherein the deployment mechanism, with the base portion mounted at the frame of the B-pillar of the vehicle door, and responsive to the control module actuating the latch mechanism to unlock the vehicle door, is electrically operated to move the handle portion from the recessed position to the deployed position; and wherein, with the handle portion in the deployed position and the door unlocked, the handle portion is graspable by the user to open the vehicle door.

18. The vehicular exterior door handle assembly of claim 17, wherein the deployment mechanism comprises an electrically operable actuator and a control link, and wherein the control link, with the base portion mounted at the frame of the B-pillar of the vehicle door, is mechanically coupled to the handle portion, and wherein the electrically operable actuator, when the deployment mechanism is operated to move the handle portion between the recessed position and the deployed position, is electrically operated to move the control link relative to the electrically operable actuator between a retracted position and an extended position.

19. The vehicular exterior door handle assembly of claim 18, wherein the electrically operable actuator is disposed at an interior portion of the frame of the B-pillar of the vehicle door.

20. The vehicular exterior door handle assembly of claim 19, wherein the control link, with the base portion mounted at the frame of the B-pillar of the vehicle door, extends through an aperture formed in the frame of the B-pillar of the vehicle door to engage the handle portion.

21. A vehicular exterior door handle assembly, the vehicular exterior door handle assembly comprising:

a base portion configured to mount at an outer surface of a frame of a vehicle door;

a handle portion including a grasping portion;

wherein the handle portion is movable relative to the base portion between (i) a recessed position, where the grasping portion of the handle portion is at least partially recessed at the base portion, and (ii) a deployed position, where the grasping portion of the handle portion protrudes outward from the base portion so as to be graspable by a user;

wherein the handle portion is pivotably mounted at the base portion, and wherein the handle portion is pivotable relative to the base portion between the recessed position and the deployed position;

wherein, with the base portion mounted at the frame of the vehicle door and with the handle portion in the recessed position, (i) the handle portion is outboard of the outer surface of the frame of the vehicle door and (ii) no portion of the handle portion extends inboard of an innermost part of the base portion toward the outer surface of the frame of the vehicle door;

wherein, with the base portion mounted at the frame of the vehicle door and with the handle portion in the recessed position, an outer surface of the base portion and an outer surface of the handle portion are exposed at and establish respective Class-A surfaces at the vehicle door, and wherein the outer surface of the base portion and the outer surface of the handle portion are flush with a Class-A surface of the vehicle door adjacent the vehicular exterior door handle assembly;

a deployment mechanism, wherein the deployment mechanism, with the base portion mounted at the frame of the vehicle door, is coupled to the handle portion and operable to move the handle portion between the recessed position and the deployed position;

wherein the deployment mechanism is accommodated within an interior portion of the frame of the vehicle door;

a control module comprising electronic circuitry is disposed remote from the vehicular exterior door handle assembly, wherein the control module is configured to control a latch mechanism of the vehicle door;

wherein the control module, based on a user input, actuates the latch mechanism of the vehicle door to unlock the vehicle door;

wherein the deployment mechanism, with the base portion mounted at the frame of the vehicle door, and responsive to the control module actuating the latch mechanism to unlock the vehicle door, is electrically operated to move the handle portion from the recessed position to the deployed position;

wherein the handle portion is pivotably mounted at the base portion via a pivot element, and wherein the deployment mechanism, with the base portion mounted at the frame of the vehicle door, engages the pivot element to move the handle portion between the recessed position and the deployed position; and wherein, with the handle portion in the deployed position and the door unlocked, the handle portion is graspable by the user to open the vehicle door.

22. The vehicular exterior door handle assembly of claim 21, wherein the deployment mechanism comprises an electrically operable actuator and a control link, and wherein the control link, with the base portion mounted at the frame of the vehicle door, is mechanically coupled to the handle portion, and wherein the electrically operable actuator, when the deployment mechanism is operated to move the handle portion between the recessed position and the deployed position, is electrically operated to move the control link relative to the electrically operable actuator between a retracted position and an extended position.

23. The vehicular exterior door handle assembly of claim 22, wherein the control link, with the base portion mounted at the frame of the vehicle door, extends through an aperture formed in the outer surface of the frame of the vehicle door to engage the handle portion.

24. The vehicular exterior door handle assembly of claim 21, wherein the pivot element comprises a ramped interface, and wherein the deployment mechanism comprises a corresponding ramped interface, and wherein, when the deployment mechanism is operated to move the handle portion between the recessed position and the deployed position, the ramped interface of the deployment mechanism moves along the ramped interface of the pivot element to pivot the handle portion relative to the base portion between the recessed position and the deployed position.

25. The vehicular exterior door handle assembly of claim 21, wherein the base portion comprises an applique configured to mount at the outer surface of the frame of the vehicle door.

\* \* \* \* \*